Patented July 28, 1925.

1,547,732

UNITED STATES PATENT OFFICE.

WALTER BROADBRIDGE AND EDWIN EDSER, OF LONDON, ENGLAND, ASSIGNORS TO MINERALS SEPARATION NORTH AMERICAN CORPORATION, OF NEW YORK, N. Y.

PRODUCTION OF FERTILIZER MATERIAL.

No Drawing.  Application filed July 18, 1921.  Serial No. 485,655.

*To all whom it may concern:*

Be it known that we, (Captain) WALTER BROADBRIDGE and EDWIN EDSER, subjects of the King of England, both residing at London, England, have invented certain new and useful Improvements in the Production of Fertilizer Material, of which the following is a specification.

This invention consists in improvements in or relating to the production of fertilizer material, the object being to produce a high grade phosphate from crude phosphatic material.

Calcium phosphate occurs widely in nature in the minerals phosphorite, apatite and the like. Frequently, comparatively pure material which occurs in veins is used directly for the manufacture of superphosphate fertilizer, but in many cases the phosphatic mineral occurs in close association with other minerals such as quartz, silicates or calcium carbonate, which contain no phosphorus thus rendering the crude material commercially unavailable for the production of superphosphate. Again, the crude material may contain ferric oxide and alumina which are objectionable since, if used for the production of superphosphate, the ferric oxide and alumina are likely to cause reversion of the superphosphate to insoluble phosphate; also the iron and aluminium phosphates are insoluble and are of no value as manures.

It has been found that material containing less than 25% $P_2O_5$ cannot be economically used for the production of superphosphate, but many of the naturally occurring phosphatic materials at present available contain a proportion of $P_2O_5$ considerably less than 25% and therefore have been regarded as commercially worthless.

According to this invention a process for concentrating the phosphate values of phosphatic minerals comprises submitting the mineral in the form of a pulp to concentration by froth flotation so as to obtain purified phosphatic material in the froth.

Thus the powdered phosphatic material mixed with water may be subjected to agitation and aeration in the presence of a frothing agent such as oleic acid or soap and in the presence of an agent (such as sodium silicate) which causes an effective wetting of the mineral constituents which are not to be floated.

A further feature of this invention lies in the fact that the frothing agent such as oleic acid before addition to the mixture of material and water may be emulsified by mixing it with water containing a small proportion of an emulsifying agent such as sodium carbonate, sodium resinate or sodium oleate.

Dealing with the method in fuller detail, the treatment of the crude phosphatic material and the nature and proportion of the agents employed will vary according to the nature of the material, and preliminary tests are necessary to ascertain the best conditions of working.

In the first place the crude phosphatic material is pulverized either in a dry or in a wet condition. Conveniently, the coarse crushing may be done in a dry crushing apparatus and the fine pulverization may be carried out in a ball mill, tube mill or the like in the presence of water, the material being crushed to 80 or 100 mesh. As the mixture of powdered material and water is subsequently to be subjected to agitation and aeration so as to form a froth, it may be advantageous to add the frothing agent to the water in the ball mill, tube mill or other wet grinding apparatus.

The finely powdered material, suspended in water containing the frothing agent is then subjected to agitation and aeration so as to disseminate throughout the liquid mass minute gaseous bubbles to which the particles of phosphatic mineral become attached and can thus be floated to the surface of the liquid in the form of a phosphatic material bearing froth, and thereby separated from the other particles which are not so floated. In order to ensure that the undesirable particles shall not be included in the froth there is added to the mixture of powdered material and water a modifying agent which will cause the water effectively to wet the surfaces of the particles which are not to be floated and thus prevent them from adhering to the gaseous bubbles. The apparatus employed for this part of the process may be any of the well known forms of apparatus now in use in the froth flotation process of concentrating ores.

The frothing agent added to the water may be entirely soluble in the water or it may be insoluble or a mixture of both. Frothing agents which have been already found effective in the treatment of crude phosphatic material are oleic acid and soap but other frothing agents may be substituted therefor. The soap furnishes a fatty acid or soap-forming radical and an alkaline radical.

One modifying agent which has been successfully used to prevent the flotation of the silica and silicates, ferric oxide, alumina and some other undesirable constituents of a crude phosphatic material is sodium silicate (soluble waterglass).

During the agitation and aeration process it is important to distribute the frothing agent such as oleic acid as effectively as possible throughout the pulp. We have found that to facilitate this distribution it is advantageous to mix the oleic acid or the like before use with water containing a small proportion of an emulsifying agent such as sodium resinate, sodium oleate or sodium carbonate. Where the frothing agent itself is a soap, such as sodium oleate, it is desirable that the water in which the crude material is suspended should be soft water. When oleic acid is used, and the water is hard, a small amount of sodium resinate may be used to facilitate the production of a froth.

In some cases when the crude material treated is of very low grade, it may be advisable to retreat or reconcentrate the product obtained by the primary flotation. This can be done by subjecting the primary concentrate to agitation and/or aeration in water containing a small amount of sodium silicate, without the addition of oleic acid or other frothing agent, the froth containing the phosphatic material being removed as before.

The froth obtained by the concentration process carries the phosphatic particles and after removal of the water from the froth the phosphatic concentrate can be stored for sale or it can if desired be subjected to further treatment for the production of fertilizer. The froth removed from the concentrating apparatus may be drained or filtered, conveniently by passing it to a mechanical filter which discharges the concentrated phosphorite in the state of a damp powder. This powder may if desired, either in the damp state or first dried, be subjected to treatment with sulphuric acid for the production of superphosphate.

Further, where the concentrated phosphatic powder is used in a damp state, and the addition of sulphuric acid thereto gives rise to excessive heat, suitable precautions well known to those skilled in the art, are adopted to prevent injurious results.

The following is a description by way of example of one method of treatment, according to this invention, in a small scale test.

The crude material (a Spanish phosphorite associated with quartz and other minerals), contained 48.5% of matter insoluble in hot dilute aquaregia (hereinafter referred to as insolubles) and 20.5% $P_2O_5$.

1200 gm. of this material were ground to pass a screen of 80 mesh to the lineal inch and mixed with 4800 gm. of soft water to which sodium silicate (60° Bé.) was added at the rate of 2 lbs. per ton of crude material.

The pulp was agitated and aerated while oleic acid was added drop by drop to the extent of 2.3 lbs. per ton of crude material. The froth containing the phosphatic material was removed in two stages. The first froth containing 62.1% of the total $P_2O_5$ of the crude material assayed 38.4% $P_2O_5$ and 5.37% insolubles. The second froth containing 32.4% of the total $P_2O_5$ of the crude material assayed 30.8% $P_2O_5$ and contained 17.97% insolubles.

The mixed froths would have assayed 35.4% $P_2O_5$ and 10.3% insolubles with a recovery of 94.5% of the total $P_2O_5$. The materials which were not floated assayed 1.05% $P_2O_5$ and comprised 95.9% insolubles.

In another test the process according to this invention was applied to the dump material from a Spanish mine, i. e. the material which is rejected after hand-picking. This rejected material assayed 52% calcium phosphate, 0.695% of iron and 46.1% of insolubles, 400 grammes of the ore were crushed to pass through a screen of 60 meshes to the lineal inch I. M. M., and mixed with 1600 c. cs. of water. There was added to the pulp the equivalent of 1 lb. of oleic acid per ton of ore and 1 lb. of sodium silicate per ton of ore, and the pulp was subjected to agitation and aeration in the usual way. The concentrates recovered in the froth assayed 79.3% calcium phosphate, 0.363% iron, and 10.9% insolubles and contained 98.2% of the calcium phosphate in the original sample. The tailings on the other hand contained only 1.8% of the calcium phosphate in the original sample and contained 94.4% of insolubles.

To convert the phosphate concentrates into soluble superphosphate fertilizer, the calcium phosphate (ground to pass a screen of 80 mesh I. M. M.) may be mixed with chamber sulphuric acid (sp. gr. 1.53 to 1.61) containing 62.5% to 69.5% of $H_2SO_4$. The weight of acid added amounts to about 70% of the weight of the calcium prosphate treated, some variations being inevitable on account of variations in the material treated. The mixture of acid and calcium phosphate becomes hot (it may reach for example a temperature of 100° C.) and is left until it forms a solid dry mass, which is then ground.

Formula for the reaction.

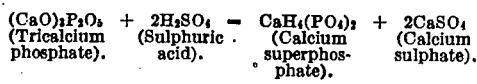

In a test of concentrates obtained by flotation of the dump material from the Alagon mine in Spain the acid used was somewhat stronger than chamber acid, its density being 1.8. Sufficient acid was added to form a very thick paste which formed a hard dry mass on standing, the mixture was warmed to about 100° C. and kept at that temperature for several hours.

In commercial practice, the heat generated by the reaction of the acid is sufficient to ensure the success of the process, but in small scale experiments independent heating is advisable. The final product had a hard gray colour and on analysis yielded the following results:—

| Insolubles. | Total $P_2O_5$. | Soluble $P_2O_5$. | Soluble superphosphate. |
|---|---|---|---|
| 5.72% | 21.01% | 15.77% | 26.02% |

What we claim as our invention and desire to secure by Letters Patent is:—

1. The process of concentrating phosphatic minerals which consists in agitating a pulp of the suitably ground phosphatic material with a suitable mineral-frothing agent to form a phosphate-bearing froth relatively free from non-phosphate material, and separating the froth.

2. The process of concentrating phosphate minerals which consists in agitating a pulp of the suitably ground phosphatic material with a fatty acid to form a phosphate-bearing froth relatively free from non-phosphate material, and separating the froth.

3. The process which consists in subjecting a pulp of crude phosphatic material to agitation and aeration with a suitable mineral-frothing agent in the presence of an agent which causes an effective wetting of the undesired constituents of the material so as to produce a phosphate-bearing froth relatively free from non-phosphate material, and separating the froth.

4. The process which consists in subjecting a pulp of phosphatic material to agitation and aeration with oleic acid and sodium resinate to produce a phosphate-bearing froth relatively free from non-phosphate material, and separating the froth.

5. The process which consists in subjecting a pulp of crude phosphatic material to agitation and aeration in the presence of an emulsified mineral-frothing agent, together with an agent causing an effective wetting of non-phosphate material, to produce a phosphate-bearing froth relatively free from non-phosphate material, and separating the froth.

6. The process which consists in subjecting a pulp of crude phosphatic material to agitation and aeration in the presence of an oily mineral-frothing agent formed into an emulsion with water and a small proportion of an emulsifying agent, together with an agent causing an effective wetting of non-phosphate material, to produce a phosphate-bearing froth relatively free from non-phosphate material, and separating the froth.

7. The process which consists in subjecting a pulp of crude phosphatic material to agitation and aeration in the presence of a mineral-frothing agent and sodium silicate, to produce a phosphate-bearing froth relatively free from non-phosphatic material, and separating the froth.

8. The process which consists in subjecting a pulp of crude phosphatic material to agitation and aeration in the presence of oleic acid and sodium silicate, to produce a phosphate-bearing froth relatively free from non-phosphatic material, and separating the froth.

9. The process which consists in subjecting a pulp of crude phosphatic material to agitation and aeration in the presence of emulsified oleic acid and sodium silicate, to produce a phosphate-bearing froth relatively free from non-phosphatic material, and separating the froth.

10. The process which consists in subjecting a pulp of crude phosphatic material to agitation and aeration in the presence of an agent including a fatty acid and alkaline material so as to produce a phosphate-bearing froth relatively free from non-phosphate material, and separating the froth.

11. The process which consists in subjecting a pulp of crude phosphatic material to agitation and aeration in the presence of oleic acid so as to produce a phosphate-bearing froth relatively free from non-phosphate material, and separating the froth.

12. The process which consists in subjecting a pulp of crude phosphatic material to agitation and aeration in the presence of a soap-forming radical and an alkali so as to produce a phosphate-bearing froth relatively free from non-phosphate material, and separating the froth.

In testimony whereof we have signed our names to this specification in the presence of two subscribing witnesses.

WALTER BROADBRIDGE.
EDWIN EDSER.

Witnesses:
H. C. HANKINS,
R. G. THYME.